SAMUEL IDE.
Improvement in Scroll Sawing Machines.
No. 124,956.                                     Patented March 26, 1872.
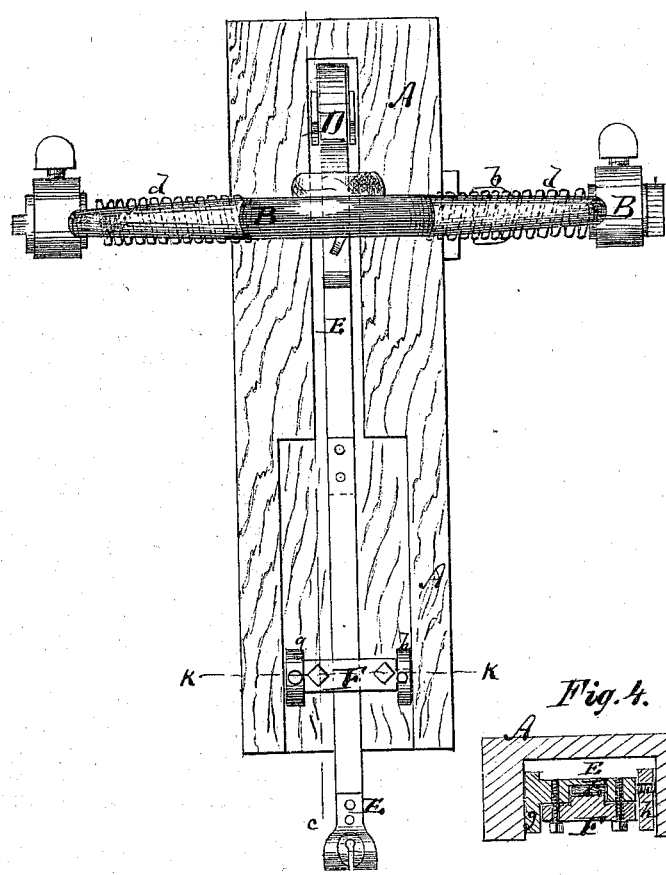
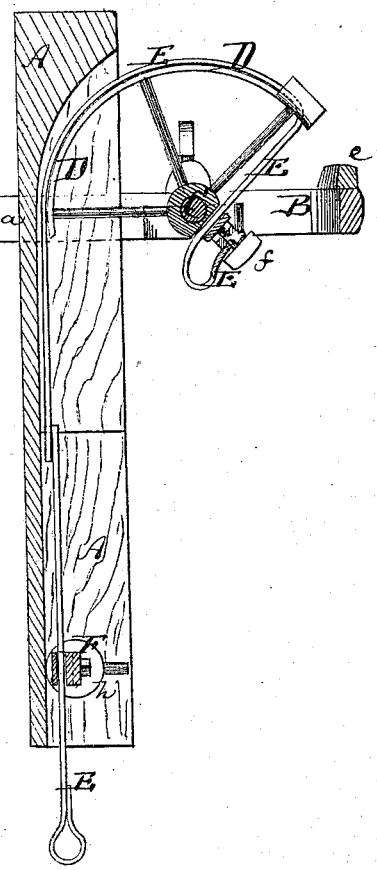
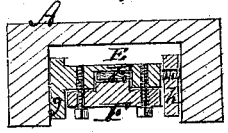
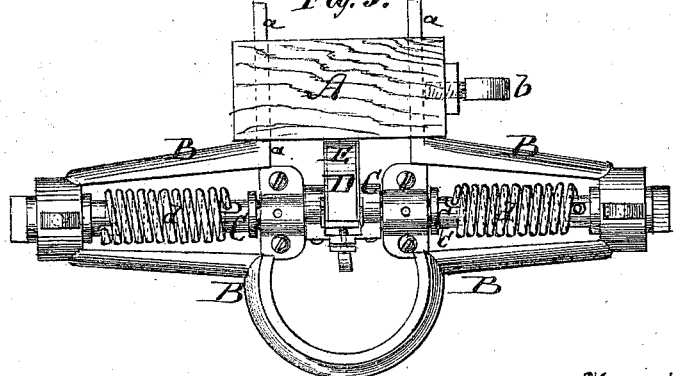
Witnesses:
P. C. Dieterich
Geo. W. Mabee
Inventor:
S. Ide
per ——— Attorneys.

UNITED STATES PATENT OFFICE.

SAMUEL IDE, OF MEDINA, NEW YORK.

IMPROVEMENT IN SCROLL-SAWING MACHINES.

Specification forming part of Letters Patent No. 124,956, dated March 26, 1872.

Specification describing a new and Improved Scroll-Saw Strainer, invented by SAMUEL IDE, of Medina, in the county of Orleans and State of New York.

Figure 1 represents a front view of my improved scroll-saw strainer; Fig. 2 is a vertical transverse section of the same on the line $c\ c$, Fig. 1; Fig. 3 is a top view, and Fig. 4 is a horizontal section of the same on the line K K, Fig. 1.

Similar letters of reference indicate corresponding parts.

This invention relates to a device for straining scroll-saws, and causing the upper belt on which the saw is held to draw exactly in line with the saw, whatever may be the rake or horizontal sweep of the same. The invention consists, first, in connecting the said belt with a segment mounted upon a shaft in an adjustable frame, which is acted upon by springs to draw the belt straight; secondly, in making the bearings of said shaft laterally adjustable, and also in the arrangement of a vibrating and adjustable belt-guide.

A in the drawing represents the stationary frame-work, by which the parts of the mechanism are held. B is a metal frame, furnishing the bearings for a horizontal shaft, C, and provided with projecting straight horizontal arms $a\ a$ that enter the frame A, as shown in Fig. 3. On the arms $a$ the frame B can be moved in or out at will to bring the shaft C nearer to or further away from the face of the frame A. A set-screw, $b$, through the side of A clamps the frame B in any desired position after the requisite adjustment. Upon the shaft C is mounted a segment, D, with a like rim. The ends of the shaft C are connected with coiled springs $d\ d$, whose tendency is to throw the segment forward against a fixed cushion, $e$, on the frame B. E is the belt or strap, which connects with the upper end of the saw. It is carried through a slotted guide, F, and then upward over the rim of the segment D, and finally through a slot in the shaft C, where it is clamped firmly by a set-screw, $f$, as indicated in Fig. 2. By being thus clamped the belt E is at liberty to be lengthened or shortened at will. The frame B, shaft C, and segment D can be thrown more or less far forward to adjust the belt exactly in position with the saw and with the degree of rake or sweep to be given the same. The belt-guide F is a slotted plate with circular disks, $g$ and $h$, at the ends of which one, $h$, is a nut, and can be screwed out to clamp and pivot the guide between the sides of the grooved frame A, in the manner substantially as indicated in Fig. 4. The guide F, it is evident, is adjusted forward or backward, in conformity with the position of the shaft C and of the saw.

Having thus described my invention, I claim as new, and desire to secure by Letters Patent—

1. The laterally-adjustable frame B, carrying the spring rock-shaft C, and arrayed on the frame A, substantially as herein shown and described.

2. In combination with the elements of preceding claim, the segment D and screw $f$, for carrying and adjusting the belt E, as set forth.

3. The pivoted slotted belt-guide F, provided with the nut $h$ at the ends, as and for the purpose specified.

SAMUEL IDE.

Witnesses:
 GEO. J. AVERILL,
 ANDREW COOK.